United States Patent
Schwarz et al.

(10) Patent No.: US 10,141,746 B2
(45) Date of Patent: Nov. 27, 2018

(54) CASCADE OF SAFETY SWITCHES WITH ADDITIONAL VOLTAGE SOURCE CONNECTION

(71) Applicant: SICK AG, Waldkirch (DE)

(72) Inventors: Adrian Schwarz, Waldkirch (DE); Shinde Geeta, Admirax (SG); Victor Kok Heng Phay, Admirax (SG)

(73) Assignee: SICK AG, Waldkirch (DE)

( * ) Notice: Subject to any disclaimer, the term of this patent is extended or adjusted under 35 U.S.C. 154(b) by 163 days.

(21) Appl. No.: 15/279,938

(22) Filed: Sep. 29, 2016

(65) Prior Publication Data
US 2017/0098938 A1  Apr. 6, 2017

(30) Foreign Application Priority Data
Oct. 5, 2015 (DE) .......... 10 2015 116 899

(51) Int. Cl.
*H01H 31/10* (2006.01)
*H01H 33/52* (2006.01)
(Continued)

(52) U.S. Cl.
CPC ........... *H02J 4/00* (2013.01); *G05B 9/02* (2013.01); *H02J 1/06* (2013.01); *G05B 2219/1195* (2013.01)

(58) Field of Classification Search
CPC ...... H01H 47/00; H01H 47/002; H01H 47/22; H01H 51/27; H01H 89/00; H01H 31/10; H02J 4/00; H02J 1/05; H02J 3/00
(Continued)

(56) References Cited

U.S. PATENT DOCUMENTS

| 3,891,279 A | * | 6/1975 | Frait | .............. B60T 8/885 |
| | | | | 303/122.05 |
| 5,396,122 A | * | 3/1995 | Nesper | ............... F16P 3/08 |
| | | | | 307/112 |

(Continued)

FOREIGN PATENT DOCUMENTS

| EP | 2 026 156 A1 | 2/2009 |
| EP | 2720094 A1 | 4/2014 |
| EP | 2720414 A1 | 4/2014 |

OTHER PUBLICATIONS

German Search Report dated Aug. 18, 2016 corresponding to German application No. 102015116899.5.

*Primary Examiner* — Fritz M Fleming
*Assistant Examiner* — Jagdeep Dhillon
(74) *Attorney, Agent, or Firm* — Nath, Goldberg & Meyer; Jerald L. Meyer; Stanley N. Protigal

(57) ABSTRACT

A cascade of safety switches includes safety switches for the monitoring of accesses of an automation system, at least one connection unit for the arrangement between two safety switches, and a terminator for the termination of the cascade of safety switches. Each safety switch has a first conductor and a second conductor. The first conductor includes conductor cores for transmitting signals and for receiving voltage. The second conductor includes conductor cores for receiving signals and for forwarding the voltage. The connection unit has a first circuit and a second circuit. The first circuit is provided for receiving the signals of a subsequent safety switch and for forwarding the signals of the subsequent safety switch to an upstream safety switch and the second circuit is provided for connecting the connection unit to a voltage source and to a conductor core for receiving the voltage of the subsequent safety switch.

4 Claims, 1 Drawing Sheet

(51) Int. Cl.
    *H01H 33/59*   (2006.01)
    *H01H 47/00*   (2006.01)
    *H01H 85/46*   (2006.01)
    *H01H 19/14*   (2006.01)
    *H02J 4/00*    (2006.01)
    *H02J 1/06*    (2006.01)
    *G05B 9/02*    (2006.01)

(58) Field of Classification Search
    USPC ......... 307/115, 112, 125, 139, 141, 130, 11;
                                        361/209, 187, 78; 398/112
    See application file for complete search history.

(56) References Cited

U.S. PATENT DOCUMENTS

| | | | | |
|---|---|---|---|---|
| 8,269,376 B1* | 9/2012 | Elberbaum | ............ | H01H 9/167 307/115 |
| 9,036,320 B1* | 5/2015 | Elberbaum | ............ | H01H 47/22 361/160 |
| 2006/0232899 A1* | 10/2006 | Heberlein | ............ | H01H 47/002 361/78 |
| 2009/0103228 A1* | 4/2009 | Elderbaum | ............ | H01H 9/167 361/187 |
| 2015/0187528 A1* | 7/2015 | Elberbaum | ............ | H01H 51/27 361/195 |
| 2017/0040131 A1* | 2/2017 | Kraus | ................ | G05B 9/03 |
| 2017/0075345 A1* | 3/2017 | Fisher | ............. | G05B 19/41855 |

\* cited by examiner

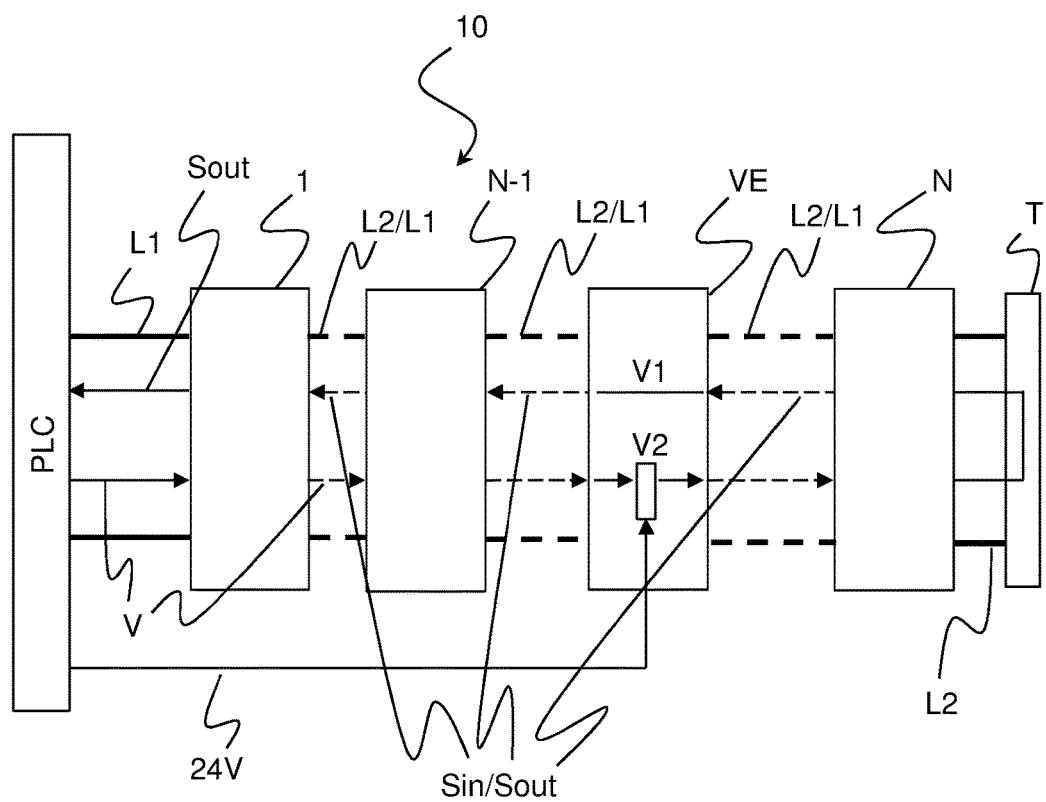

CASCADE OF SAFETY SWITCHES WITH ADDITIONAL VOLTAGE SOURCE CONNECTION

The present invention relates to a cascade of safety switches having safety switches for the monitoring of accesses of an automation system.

Conventional accesses which comprise the stationary part, such as the machine frame, door framework, door frame, machine plate or retaining bracket, and the movable part, such as doors, flaps or hoods, and together ensure a safe access to the automation system have to be monitored by safety switches with respect to their state, i.e. whether they are open or closed.

Such a monitoring is, on the one hand, implemented by electromechanical safety switches or, on the other hand, by contactless safety switches. In this respect, there is a requirement for a safe monitoring of the position of the movable part with respect to the stationary part of the access and, optionally, to detect a locking of the two parts and communicate it to a higher-ranking programmable logic controller PLC. The safety switches used for this purpose comprise a sensor part which is mounted in a fixed position at the stationary part of the access and a transmitter part which is mounted at the movable part of the access. When the access is closed, the transmitter part is located directly opposite the sensor part such that the sensor part can detect a signal of the transmitter part and can possibly communicate it as a release signal to the PLC so that the automation system can start.

In the open state of the access, the transmitter part is spaced apart from the sensor part such that the sensor part cannot detect a signal and cannot communicate a release signal to the PLC. The automation system is thereby not released for an operation or, if the automation system is already in operation, it is moved into a safe state.

In an automation system which has a plurality of accesses, there is a need to connect the safety switches of the respective accesses to one another such that an individual PLC can monitor and control the automation system. A demand in cabling is generally increased by the connection and supplying all the safety switches with voltage is made more difficult. If an output voltage is made so large that all the safety switches receive sufficient voltage, then the electrical strain on the first safety switches is too large. If the safety switches are connected in parallel to the voltage supply, then the demand in cabling is again complex and expensive.

It is therefore an object of the present invention to improve a cascade of safety switches having safety switches for the monitoring of accesses of an automation system such that a sufficient voltage supply of the cascade is made possible without an increased demand in cabling.

The object is satisfied in accordance with the invention by a cascade of safety switches having safety switches for the monitoring of accesses of an automation system; at least one connection unit for the arrangement between two safety switches; and a terminator for the termination of the cascade of safety switches, wherein each safety switch has a first conductor and a second conductor, the first conductor comprises conductor cores for transmitting signals and for receiving voltage, the second conductor comprises conductor cores for receiving signals and for forwarding the voltage, and the connection unit comprises a first circuit and a second circuit; and wherein the first circuit is provided for receiving the signals of a subsequent safety switch and for forwarding the signals of the subsequent safety switch to an upstream safety switch and the second circuit is provided for connecting the connection unit to a voltage source and to a conductor core for receiving the voltage of the subsequent safety switch.

In accordance with a preferred embodiment, the safety switches and the connection unit are connected to one another in series.

In accordance with a further preferred embodiment, the first safety switch is connected to a control.

Furthermore, in accordance with a further preferred embodiment, the safety switches are provided with voltage in series. The connection unit advantageously serves as feeding nodes of an external voltage for the subsequent safety switches.

Preferred embodiments and further developments as well as further advantages of the invention can be seen from the dependent claims, from the following description and from the drawings.

The invention will be explained in detail in the following with reference to embodiments and by means of the drawing. There is shown in the drawing:

FIG. 1 a schematic illustration of a cascade of safety switches in accordance with the invention.

A cascade of safety switches 10 in accordance with the invention is shown schematically in FIG. 1 and has a plurality of safety switches 1, N−1 and N. The safety switches 1, N−1 and N each monitor an access, not shown, of an automation system which is not shown.

The safety switches 1, N−1 and N are connected to one another in series in the cascade of safety switches 10 in accordance with the invention. In this respect, a first safety switch 1 of the series has a first conductor L1 via which the first safety switch 1 is connected to a higher-ranking programmable logic controller PLC. The first safety switch 1 furthermore has a second conductor L2 which connects the first safety switch 1 to a subsequent safety switch N−1.

The second conductor L2 of the first safety switch 1 is thus connected to the first conductor L1 of the subsequent safety switch N−1. The subsequent safety switch N−likewise has a first conductor L1 and a second conductor L2, wherein the second conductor L2 connects the subsequent safety switch N−1 to the further subsequent safety switch N.

The cascade of safety switches 10 in accordance with the invention can in this manner be connected from any desired number of safety switches 1, N−1 and N. In this respect, a safety switch N is provided at the end of the cascade of safety switches 10 which is connected to a terminator T by means of its second conductor L2, wherein the terminator T limits an end of the cascade of safety switches 10 and closes a loop of the cascade of safety switches 10.

The first conductor L1 of the respective safety switches 1, N−1 and N comprises conductor cores for transmitting signals Sout of the safety switch 1, N−1 and N and signals Sout of the subsequent safety switches N−1 and N which are received via conductor cores of the second conductor L2. The first conductor L1 of the respective safety switches 1, N−1 and N furthermore comprises conductor cores for receiving voltage V which generally amounts to 24V and which is supplied into the cascade of safety switches 10 by the PLC.

The second conductor L2 of the respective safety switches 1, N−1 and N likewise comprises conductor cores for receiving signals Sin of the subsequent safety switches N−1 and N and for forwarding the voltage V to the subsequent safety switches N−1 and N.

In this respect, transmission and reception of signals Sout and Sin in the sense of the invention mean that the signals Sout and Sin are conducted via the conductor cores from a safety switch 1, N−1 and N to the other connected safety switch 1, N−1 and N in a specific direction in the cascade of safety switches 10 in accordance with the invention. Receiving and forwarding the voltage V likewise mean that the voltage V is conducted via the conductor cores in a specific direction in the cascade of safety switches 10 from a safety switch 1, N−1 and N to another connected safety switch 1, N−1 and N.

Due to the series connection of the safety switches 1, N−1 and N in the cascade of safety switches 10 in accordance with the invention, the voltage V decreases as the number of connected safety switches 1, N−1 and N increases such that a sufficient voltage supply of the entire cascade of safety switches 10 is at risk.

In accordance with the invention, the connection unit VE is provided in the cascade of safety switches 10 in such a manner that the connection unit VE is arranged between two safety switches N−1 and N. This means that the connection unit VE and the safety switches N−1 and N are connected to one another in series.

The connection unit VE comprises a first inner circuit V1, which receives the signals of the subsequent safety switch N and transmits or forwards them to the upstream safety switch N−1. The connection unit VE furthermore comprises a second inner circuit V2 which forwards the voltage V from the upstream safety switch N−1 via a conductor core to the subsequent safety switch N, wherein the second inner circuit V2 is additionally connected to an external voltage source 24V such that additional voltage 24V can be fed into the cascade of safety switches 10 by the second circuit V2 and can be conducted to the subsequent safety switch N.

Since only the first safety switch 1 is directly connected to the PLC, each safety switch 1, N−1 and N monitors its access and the connection unit VE allows an additional voltage supply 24V of the cascade of safety switches 10 in accordance with the invention without influencing the signal transmission and without an additional demand in cabling, a series connection of the safety switches 1, N−1 and N can be achieved with a sufficient voltage supply of all the connected safety switches 1, N−1 and N.

REFERENCE NUMERAL LIST

10 cascade of safety switches
1, N−1, N safety switches
L1 first conductor
L2 second conductor
Sin received signals
Sout transmitted signals
PLC programmable logic controller
T terminator
V voltage
VE connection unit
V1 first circuit
V2 second circuit
24V additional 24V voltage supply

The invention claimed is:

1. A cascade of safety switches having safety switches for the monitoring of
   accesses of an automation system;
   at least one connection unit for the arrangement between two safety switches; and
   a terminator for the termination of the cascade of safety switches,
   wherein each safety switch has a first conductor and a second conductor, the first conductor comprises conductor cores for transmitting signals and for receiving voltage, the second conductor comprises conductor cores for receiving signals and for forwarding the voltage along the cascade, and
   the connection unit comprises a first circuit and a second circuit; and
   wherein the first circuit is provided for receiving the signals of a subsequent safety switch and for forwarding the signals of the subsequent safety switch to an upstream safety switch and the second circuit is arranged for transmitting a voltage from the subsequent safety switch to the upstream safety switch by a conductor core; and
   the connection unit providing an external voltage source to feed additional voltage into the cascade by the second circuit and conduct the additional voltage to the upstream safety switch.

2. The cascade of safety switches in accordance with claim 1, wherein the safety switches and the connection unit are connected to one another in series.

3. The cascade of safety switches in accordance with claim 1, wherein the first safety switch is connected to a control.

4. The cascade of safety switches in accordance with claim 1, wherein the safety switches are provided with voltage in series.

* * * * *